Dec. 21, 1937.   E. G. CARROLL   2,102,834
BRAKE
Original Filed Nov. 11, 1930   2 Sheets-Sheet 1

INVENTOR.
EUGENE G. CARROLL
BY Jerome R. Cox
ATTORNEY.

Dec. 21, 1937.  E. G. CARROLL  2,102,834
BRAKE
Original Filed Nov. 11, 1930  2 Sheets-Sheet 2
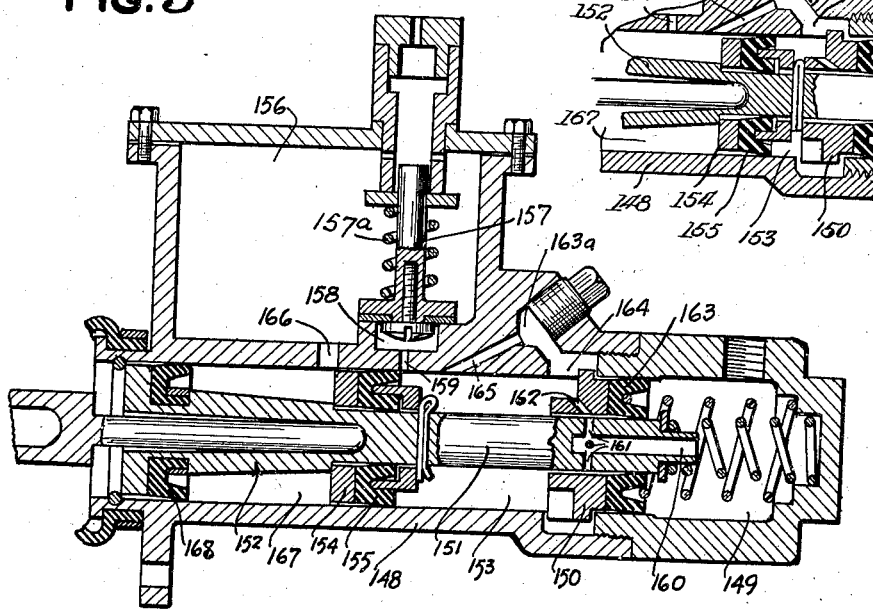
INVENTOR.
EUGENE G. CARROLL
BY Jerome R. Cox
ATTORNEY.

Patented Dec. 21, 1937

2,102,834

UNITED STATES PATENT OFFICE 2,102,834

BRAKE

Eugene G. Carroll, Los Angeles, Calif., assignor to Bendix Brake Company, South Bend, Ind., a corporation of Illinois Original application November 11, 1930, Serial No. 494,993. Patent No. 2,018,912, dated October 29, 1935. Divided and this application January 14, 1935, Serial No. 1,617

7 Claims. (Cl. 60—54.6)

This application is a division of my copending application Serial No. 494,993, filed Nov. 11, 1930 and issued as Patent No. 2,018,912, Oct. 29, 1935.

The invention relates to hydraulic brake apparatus. The braking power of trucks is generally found inadequate to stop a truck within a sufficiently short distance to prevent accidents, particularly where the trucks are heavy and carrying a heavy load. In trucks of 6-wheel type, if hydraulic brakes are installed on all the wheels, the actuation of the usual brake pedal does not readily develop sufficient operating pressure in the brake cylinders. This is due partly to the increased number of brake cylinders.

The general object of this invention is to provide hydraulic brake apparatus in which the hydraulic pressure can be very readily raised to a point much higher than ordinarily used and to provide means to develop a relatively large displacement volume in the pressure developing means to enable a large number of brake cylinders to be served effectively with the liquid under pressure, for example, in 6-wheel brake installations, though it is to be understood that my invention is also applicable to brake installations on automobiles having less or more than six wheels.

The invention may be applied in a new installation of hydraulic brakes, but one of my objects is to provide a construction which may be applied as an attachment to hydraulic brake apparatus already installed in a car to enable the hydraulic pressure to be readily increased as may be desired, for example, with my improvement the hydraulic pressure in applying the brakes can be raised from 250 or 300 pounds per square inch to approximately 500 or 600 pounds per square inch.

One of the difficulties in developing a high pressure in the present systems is that the brake is usually applied by a foot lever giving a stroke of about an inch and a quarter to the piston that develops the pressure. According to my invention I provide additional means operated by a hand lever for displacing an increased volume of the pressure liquid to boost the pressure already developed.

A further object of the invention is to provide means for insuring the proper operation of the apparatus by insuring the operation of the two controlling levers, that is, the foot lever and the hand lever, in the proper order.

A further object of the invention is to provide a master cylinder for hydraulic brakes of this type with a booster chamber to insure a full compression chamber when the compressing plunger moves forward and to provide means for relieving the pressure in advance of the booster head after the boosting effect has been attained, thereby enabling the entire force to be exerted in raising the pressure in the compression chamber.

Further objects of the invention will appear hereinafter.

The invention consists in the novel parts and combination of parts to be described hereinafter, all of which contribute to produce an efficient hydraulic brake apparatus for heavy vehicles.

A preferred embodiment of the invention is described in the following specification, while the broad scope of the invention is pointed out in the appended claims.

In the drawings:

Figure 3 is a longitudinal vertical section through a master cylinder illustrating another embodiment of the invention in which the entire compression of the liquid is effected in a single compression chamber;

Figure 4 is a view similar to Figure 3 showing the structure of Figure 3 at the end of the stroke of the piston; and Figure 5 is a fragmentary vertical section showing a portion of a master cylinder similar to a master cylinder of Figures 3 and 4 and illustrating a modification of certain details of the parts which may be employed.

Before proceeding to a detailed description of the invention, it should be understood that in practicing the invention I provide a hydraulic system for the automobile including any suitable piping leading to the wheel brakes. In addition to this, I provide foot-operated means for raising the pressure in the piping. I also provide hand-operated means for raising the pressure developed in the piping.

Figure 1:
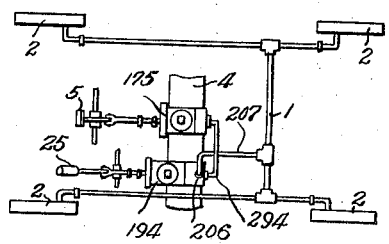
Figure 1 is a diagrammatic plan illustrating the apparatus as applied to a four-wheel brake installation.

Referring more particularly to the parts and especially to Figure 1, I represents the piping of a hydraulic system leading to the wheel brakes indicated at 2. In connection with this figure it should be understood that it is merely a diagram and at the forward wheels the piping would include the usual flexible connections to permit the wheels to be moved in steering.

In connection with the hydraulic system I include a pressure developing means which is preferably in the form of a master cylinder 175 which is mounted on the car frame 4 and arranged in such a way that it can be actuated by a foot pedal 5 one arm of which is connected to the piston 178. This pressure developing device preferably includes the cylinder 175 connected to the cylinder 194 by means of the pipe line 294. The piston of the booster cylinder 194 is operated by the second lever 25 which is preferably a hand lever mounted at convenient reach of a driver of the car. In the present instance as illustrated in Figure 1, this lever is located at the left side. However, it should be understood that in practice it may be located if desired on the right side so as to be operated by the right hand of the driver. The hand operated arm of this lever is relatively long. The outlet 206 from the upper side of the cylinder 194 is connected by the pipe 207 (see Figures 1 and 2) with the part of the piping system which that connects with the wheel brakes.

In the arrangement shown in Figures 3 and 4, I employ a single cylinder for developing a high pressure. The characteristic feature of this cylinder is that the advance of the plunger causes a considerable boost of pressure in the pressure chamber after which the further movement of the plunger greatly raises this pressure. At the same time the portion of the piston that causes the boosting effect is relieved of pressure so that in the latter part of the movement of the plunger, the plunger is developing no unnecessary resistance.

In this embodiment of the invention, I also embody the reservoir in the cylinder casting, thereby producing a very compact structure.

Referring to Figure 3, 148 indicates a cylinder, the forward end of which is formed with a compression chamber 149 closed at its lever end with a fixed head 150 through which is guided the reduced forward end 151 of a plunger 152. Back of the chamber 149 is provided a booster chamber 153 in which moves a piston head 154 carried on the plunger 152 and provided with a cup leather 155. A reservoir chamber 156 is formed over the cylinder and provided with a spring pressed relief valve 157 which opens upwardly to relieve pressure existing in the booster chamber 153. A spring 157a for valve 157 has sufficient force so as to hold about fifteen pounds of pressure in the chamber 153, this being low enough to allow the brake return springs normally to hold the brakes in the released position. The valve chamber 158 under this relief valve is provided with a supply port 159 that passes through the wall of the cylinder just in advance of the cup leather 155. The inner end of the plunger 152 has a bore 160 with radial ports 161 that are supplied with liquid from the booster chamber 153 through a port 162 in the head 150. When the plunger 152 is forced forwardly, pressure is developed in the booster chamber 153 which passes through the ports 162 and 161 into the compression chamber 149, the pressure in which is raised. This raise in pressure may be considerable due to the movement of the head 154. After the port 161 passes the cup leather 163 closing the outer end of the chamber 149, liquid in the chamber 149 becomes trapped and the further rise in pressure is caused by the further advance of the reduced portion 151 of the plunger.

The wall of the chamber 153 is provided with a bypass port 163a having an inlet at 164 near the head 150 and having an outlet at 165 near the position of rest of the piston head 154. In the operation of the cylinder after the boosting effect has been attained in the chamber 149 by the advance of the head 154, the pressure in the forward end of the chamber 153 is relieved as soon as the head 154 passes the point 165. In other words, the latter part of the stroke of the piston head 154 is bypassed to relieve the pressure in front of it and permit all of the force of the operator of the brake to be applied thereafter to the piston 151, to raise the pressure in the compression chamber 149.

The spring of the relief valve 157 will determine the maximum initial pressure that can exist in the chamber 153, by reason of the presence of the port 159.

The operating liquid in the chamber 153 and the connected pipe stem is replenished on the return stroke of the plunger 151 by reason of the fact that liquid in the reservoir 156 can pass through the port 166 into the chamber 167 formed in the cylinder 148 back of the piston 154. Any operating liquid passing into the chamber 161, however, is prevented from leaking out at the back end of the plunger by reason of a cup-leather 168 carried by the plunger.

In Figure 5 I illustrate another embodiment of my invention. I may provide a fixed head 169 with a longitudinal duct 170 formed in the guide opening for the plunger 171 and a similar longitudinal duct 172 is provided in the end of the plunger 171 that projects into the compression chamber 173 beyond the guide head 169. In the position of rest, that is to say, in the retracted position of the plunger 171, these ports 170 and 172 register together at the point 174, but as soon as the slight advance of the plunger 171 has taken place, the communication between these ports is cut off. In other words, the port 170 does not pass all the way through the fixed head 169 and in the position of rest there is a slight overlap of these ports.

The plunger 171 is provided with a piston head 275 carrying a cup leather 276 adapted to reciprocate in the cylinder 277. The cylinder 277 is formed with a portion 278 having a bore of relatively small diameter and a portion 279 having a bore of relatively large diameter. The piston head 275, together with the cup leather 276 makes a liquid tight fit in the bore 278, but in its forward position is spaced from the walls of the bore 279. As soon as the piston head 275 passes the junction between the two bores in its forward movement, liquid is allowed to by-pass around the piston head to the rear thereof whereupon the pressure exerted upon the fluid in the system is the relatively high pressure developed by the plunger 171.

Figure 2:
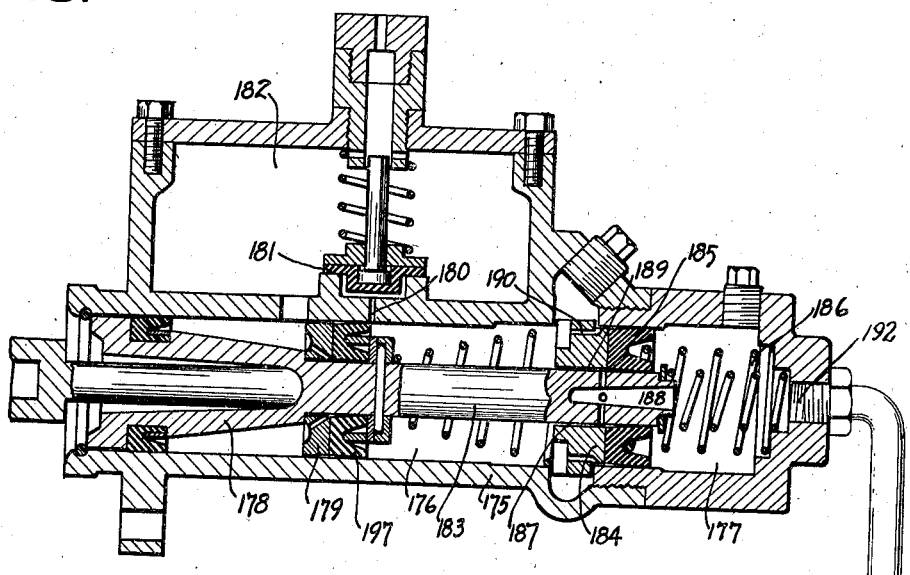
Figure 2 is a view illustrating the foot operated master cylinder and the hand operated master cylinder cooperating therewith comprising longitudinal vertical sections through the two master cylinders and disclosing further details as to the master cylinders shown in Figure 1.
Figure 2:
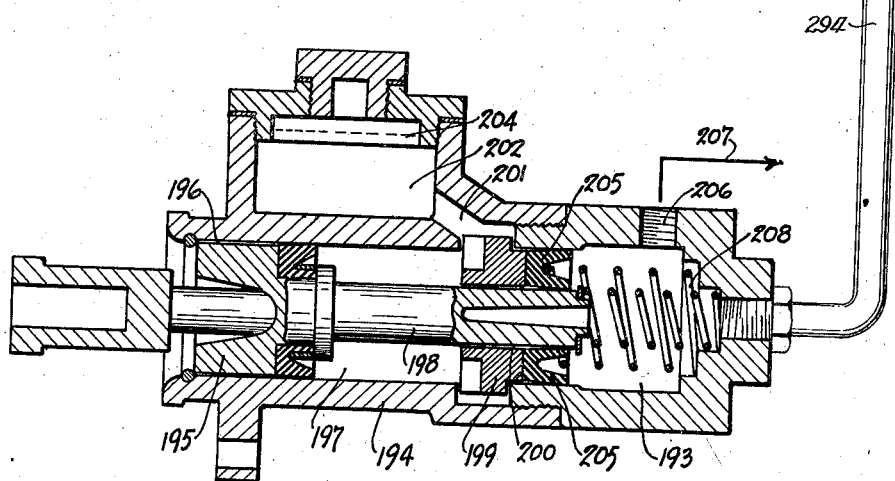

In Figure 2 I illustrated another embodiment of the booster cylinder in which I omit the by-pass port 165.

Referring to Figure 2, the cylinder 175 has a rear booster chamber 176 and a forward compression chamber 177. In the normal position of the plunger 178 the piston 179 for the booster chamber is located just to the rear of port 180 through the cylinder wall that leads under a relief valve 181 that opens into a reservoir 182. The forward shaft 183 of the plunger 178 slides through a fixed head 184 into the compression chamber 177, being provided with a cup leather packing ring 185 held against the fixed head by a coil spring 186. The shaft 183 of the plunger fits loosely in the head, as indicated at 187 and the end of the shaft 183 is formed with a central chamber 188 with ports 189 through its wall, which in the retracted position of the plunger permit the operating liquid to pass through from the chamber 176 into the chamber 177. In order to insure ample supply of liquid to the chamber 177, if desired, the fixed head may be provided with ports 190 that admit the liquid to the outer face of the cup leather 185. These features insure that the chamber 177 will always be maintained full of the operating liquid. With a cylinder having the features of construction illustrated in Figure 11, when the plunger 178 is advanced by applying the foot pedal, as soon as the cup leather 191 crosses the port 180 the pressure will rise in the chamber 176 and the fluid will flow through the ports 189 and the chamber 188 into the interior of the compression chamber 177. Liquid will also pass through the ports 190 past the outer edge of the cup leather 185 into the chamber 177. The cup leather 185 will operate as a check valve to sustain any pressure developed in the compression chamber 177.

Having exerted a considerable effort with the foot on the foot pedal, the operator of the brake can then permit a slight backward movement of the plunger 178. This will relieve the pressure in the chamber 176 but on account of the smaller diameter of the extension or shaft 183 of this plunger, will not substantially reduce the pressure in the chamber 177. In other words, this cylinder enables the operator to develop a considerable pressure in the pressure chamber 177 through the assistance of the forward movement of the piston 179 of larger diameter, but by reason of the reduced pressure in the chamber 176 occasioned by a slight let-up of the pressure on the pedal, the high pressure being held by the foot, is exerted only on the area of the end of the shaft 183. For example almost infinitesimal release of the foot pedal will on account of the incompressibility of the liquid reduce the pressure in 176 to atmospheric pressure; while on account of the slight give of the brake lining and drum, the slight expansion of the conduits, etc. substantially full pressure will be retained in 177.

The operating liquid under pressure would pass out of the chamber 177 through an outlet 192 connected to a pressure chamber 193 by a pipe 294. This pressure chamber 193 is in the forward end of a cylinder 194 having a plunger 195 actuated by a hand lever, and the plunger 195 has a rear piston 196 working in a rear chamber 197 of substantially the same diameter as the chamber 193. The reduced forward extension or shaft 198 of the plunger passes loosely through a fixed head 199 so that when the plunger 195 moves forward, liquid in it is forced through the annular clearance space 200 into the chamber 193, which assists in raising the pressure in the chamber 193. It is to be understood in the normal operation of the brake the plunger 178 is first operated by the foot pedal so as to develop substantial brake applying pressure at the brakes and when that pressure has been developed the operator by a slight release of the pedal can hold the pressure applied by a small force due to the relatively small area of the piston 183. Thereafter operation of the hand lever operates the plunger 195 to develop much higher pressures, due to the fact that at such time the port in the extension 183 which connects the grooves 189 with the opening 188 has moved forward so that it no longer is connected with the grooves 189 and instead is sealed by the cup 185. Therefore the pressure developed by the plunger 195 and its pistons 196 and 198 does not by-pass past the cup 185. The forward end of the chamber 197 is connected by a passage 201 to a closed reservoir 202. This reservoir would operate as an air trap to catch any air that might pass into the chamber 197 on the back stroke of the plunger. Such air could, of course, pass the cup leather 203 which would operate as a check valve to prevent escape of the operating liquid past the head 196. If the level, indicated by the line 204 of the operating liquid, is maintained high up in the reservoir 202, it is evident that the plunger 196 might assist considerably in developing the desired working pressure in the chamber 193.

However, in the operation of this cylinder it is impossible to build up a pressure in the chamber 202 higher than the working pressure of the system because on the back stroke of the plunger 195 the pressure in the chamber 197 and in the reservoir 202 would be relieved through the clearance space at 200 into the chamber 193 and communicated back through the pipe indicated by the line 194 to the chamber 177, and thence relieved through the port 189 to the chamber 176, and thence to the reservoir 182, through the relief valve 181.

A cup leather 205, provided on the forward face of the fixed head 199, is held in place by a coil spring 205. The chamber 193 is provided with an outlet 206 that is connected by a pipe, indicated by the line 207, with the brake actuating devices at the wheels.

It is understood that the embodiment of the invention described herein is only one of the many embodiments this invention may take, and I do not wish to be limited in the practice of the invention, nor in the claims, to the particular embodiment set forth.

I claim:

1. In a master cylinder for hydraulic brakes, a casing having a compression chamber and a booster chamber having substantially the same diameter as said compression chamber with a head separating said chambers, a plunger having a head sliding in the booster chamber for developing pressure therein at the commencement of the forward stroke of the plunger and having a cylindrical extension passing through the first-named head into the compression chamber, means for opening communication through the cylindrical extension of the plunger between the booster chamber and the compression chamber when the plunger is in its retracted position, and means for by-passing the liquid from in front of the head of the plunger after the pressure in the compression chamber has been boosted by the advance of the rear head of the plunger, said compression chamber having means for connecting the same to the brakes.

2. In a master cylinder for hydraulic brakes, a casing having a compression chamber and a booster chamber having substantially the same diameter as said compression chamber with a head separating said chambers, a plunger having a head sliding in the booster chamber for developing pressure therein at the commencement of the forward stroke of the plunger and having a cylindrical extension passing through the first-named head into the compression chamber, means for opening communication through the cylindrical extension of the plunger between the booster chamber and the compression chamber when the plunger is in its retracted position, means for bypassing the liquid from in front of the head of the plunger after the pressure in the compression chamber has been boosted by the advance of the head of the plunger, said compression chamber having means for connecting the same to the brakes, a reservoir having a port leading therefrom into the booster cylinder just in advance of the head of the plunger, and having a relief valve associated therewith for determining the initial operating pressure of the booster chamber and the compression chamber.

3. In a hydraulic brake apparatus, the combination of a master cylinder having a booster chamber and a compression chamber with a head separating the same and having a feed chamber to the rear of the booster chamber, a plunger with a cylindrical extension guided to slide through the said head, said plunger having a head separating the feed chamber from the booster chamber, a supply reservoir for the operating liquid communicating with the feed chamber, said booster chamber having a port through the wall thereof just in advance of the head of the plunger when in its retracted position, with a relief valve associated with the port for admitting liquid from the booster chamber into the reservoir, said cylindrical extension and said first-named head having communicating ports for admitting liquid from the booster chamber into the compression chamber in the retracted position of the plunger, said compression chamber having means for connecting the same with the brakes.

4. A master cylinder for hydraulic brakes, having a forward compression chamber and a rear compression chamber with a substantially fixed head separating the same, a plunger having an extension of reduced diameter sliding through the fixed head and having a piston head of larger diameter working in the rear chamber, check means associated with the fixed head permitting liquid under pressure to pass through into the forward compression chamber but checking return flow of the same, said forward chamber having an outlet leading to the brakes, said plunger operating on the forward stroke to force liquid from the rear chamber into the forward chamber and thereby raise the pressure in the forward chamber, said parts cooperating so that a slight rearward movement of the plunger after the pressure has developed, relieves the pressure in the rear chamber and enables the pressure in the forward chamber to be sustained by exerting a reduced force on the plunger.

5. A master cylinder for hydraulic brakes, having a forward compression chamber and a rear compression chamber with a substantially fixed head separating the same, a plunger having an extension of reduced diameter sliding through the fixed head and having a piston head of larger diameter working in the rear chamber, check means associated with the fixed head permitting liquid under pressure to pass through into the forward compression chamber but checking return flow of the same, said forward chamber having an outlet leading to the brakes, said plunger operating on the forward stroke to force liquid from the rear chamber into the forward chamber and thereby raise the pressure in the forward chamber, said parts cooperating so that a slight rearward movement of the plunger after the pressure has developed, relieves the pressure in the rear chamber and enables the pressure in the forward chamber to be sustained by exerting a reduced force on the plunger, and means for establishing communication between the forward and rear chambers when the plunger is in its retracted position.

6. A master cylinder for hydraulic brakes having a forward compression chamber and a rear compression chamber with a substantially fixed head between the same, a plunger with a head sliding in the rear chamber and having a reduced extension passing through the fixed head into the forward compression chamber, the rear end of the rear chamber beyond the plunger head being open to the atmosphere, said rear chamber having a closed air-tight chamber communicating therewith and said fixed head having check means for permitting liquid under pressure to pass from the rear chamber into the forward chamber when the plunger is moved forwardly to increase the pressure in the forward chamber.

7. In a hydraulic brake apparatus, the combination of a master cylinder having a booster chamber and a compression chamber having substantially the same diameter as said booster chamber with a head separating the same and having a feed chamber to the rear of the booster chamber, a plunger with a cylindrical extension guided to slide through the said head, said plunger having a head separating the feed chamber from the booster chamber, a supply reservoir for the operating liquid communicating with the feed chamber, said booster chamber having a port through the wall thereof just in advance of the head of the plunger when in its retracted position, with a relief valve associated with the port for admitting liquid from the booster chamber into the reservoir, said cylindrical extension and said first-named head having communicating ports for admitting liquid from the booster chamber into the compression chamber in the retracted position of the plunger, said compression chamber having means for connecting the same with the brakes, said booster chamber having a bypass port operating after the plunger head has advanced to a predetermined point, to bypass liquid around the same and relieve the pressure in front of the plunger head while the cylindrical extension of the plunger is developing the operating pressure in the compression chamber.

EUGENE G. CARROLL.

CERTIFICATE OF CORRECTION.

Patent No. 2,102,834.　　　　　　　　　　　　　　　　December 21, 1937.

EUGENE G. CARROLL.

It is hereby certified that error appears in the printed specification of the above numbered patent requiring correction as follows: Page 3, second column, line 62, claim 1, strike out the word "rear"; and that the said Letters Patent should be read with this correction therein that the same may conform to the record of the case in the Patent Office.

Signed and sealed this 15th day of March, A. D. 1938.

(Seal)

Henry Van Arsdale,
Acting Commissioner of Patents.